(12) United States Patent
Mori et al.

(10) Patent No.: US 6,913,558 B2
(45) Date of Patent: Jul. 5, 2005

(54) CONTROL SYSTEM FOR STOPPING AND STARTING VEHICLE ENGINE

(75) Inventors: Ryuichi Mori, Utsunomiya (JP); Kazuhiko Kitano, Kawachi-gun (JP); Koichi Fushimi, Utsunomiya (JP); Hiroyuki Okajima, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/633,514

(22) Filed: Aug. 5, 2003

(65) Prior Publication Data
US 2004/0029677 A1 Feb. 12, 2004

(30) Foreign Application Priority Data
Aug. 7, 2002 (JP) ..................... P2002-230520

(51) Int. Cl.[7] ............................ B60K 1/02
(52) U.S. Cl. .............. 477/3; 477/97; 477/98; 477/107; 180/65.2; 701/54; 701/112
(58) Field of Search ................ 477/3, 97, 98, 477/107; 180/65.2; 701/54, 112

(56) References Cited

U.S. PATENT DOCUMENTS

| | | | |
|---|---|---|---|
| 6,390,947 B1 * | 5/2002 | Aoki et al. ............ | 477/3 |
| 6,692,402 B2 * | 2/2004 | Nakamori et al. ....... | 477/3 |
| 6,709,362 B2 * | 3/2004 | Tomohiro et al. ....... | 477/3 |
| 6,716,138 B2 * | 4/2004 | Matsubara et al. ...... | 477/167 |

FOREIGN PATENT DOCUMENTS

| | | |
|---|---|---|
| JP | 2000-045807 | 2/2000 |
| JP | 2000-104587 | 4/2000 |
| JP | 2000-230442 | 8/2000 |
| JP | 2000-352462 | 12/2000 |
| JP | 2001-041067 | 2/2001 |
| JP | 2001-090828 | 4/2001 |
| JP | 2001-208177 | 8/2001 |
| JP | 2002-130450 | 5/2002 |
| JP | 2002-206630 | 7/2002 |

* cited by examiner

*Primary Examiner*—Saul Rodriguez
*Assistant Examiner*—David D. Le
(74) *Attorney, Agent, or Firm*—Arent Fox (57) ABSTRACT

An engine stop and start control system for securing a normal line pressure in a hydraulic circuit of the transmission. The system has an engine as a power source for driving the vehicle; a transmission; a mechanical oil pump, operated by the power produced by the engine, for supplying oil pressure to the transmission; an automatic engine stopping and starting section for automatically stopping the engine under predetermined stopping conditions and automatically starting the engine under predetermined starting conditions; and an electric oil pump operated when the predetermined stopping conditions are satisfied, so as to supply the oil pressure to the transmission. The automatic engine stopping and starting section has a control section for prohibiting the automatic engine stop when the line pressure in a hydraulic circuit for supplying oil pressure to the transmission is equal to or lower than a predetermined value while the engine is operated.

6 Claims, 4 Drawing Sheets

CONTROL SYSTEM FOR STOPPING AND STARTING VEHICLE ENGINE

BACKGROUND OF THE INVENTION

1. Field of the Invention

The present invention relates to a control system for stopping and starting the engine of a vehicle, which is typically a hybrid vehicle having an engine and a motor as driving sources.

2. Description of the Related Art

Recently, in order to economize on fuel for driving the engine, reduce exhaust gas generated by fuel combustion, and the like, hybrid vehicles have been developed, in which an engine and a motor which can generate power (called a "motor generator", hereinbelow) are coupled with the power transmission mechanism which is coupled with driving wheels of the vehicle. In such a hybrid vehicle, (i) while the vehicle is running, the driving power is assisted using the motor generator according to need, and (ii) the power input via the driving wheels during deceleration is transmitted to the motor generator, and the motor generator performs regeneration so as to convert the deceleration energy into regenerated energy which is stored in a storage battery as electrical energy.

When a hydraulic automatic transmission is employed in the above-explained hybrid vehicle, the working oil pressure in the transmission mechanism of the automatic transmission is secured by a hydraulic pump driven by the engine. However, if the engine is stopped while the vehicle is stopped so as to wait until the traffic light turns green, the hydraulic pump is also stopped so that the necessary working oil pressure of the transmission mechanism cannot be secured.

In consideration of these circumstances, hybrid vehicles having an electric oil pump in addition to the above-explained hydraulic pump (called a mechanical oil pump, hereinbelow) have been developed, so as to secure the working oil pressure in the transmission mechanism even when the engine is stopped. If the working oil pressure is secured even when the engine is stopped, it is possible to prevent the supply of the oil pressure from being delayed at the starting of the vehicle.

In the vehicle having both the mechanical and electric oil pumps, a specific oil pressure must be secured using the electric oil pump while the engine is stopped, in consideration of the object for providing the electric oil pump. If the specific oil pressure is not secured for some reason during the operation of the electric oil pump, when the engine is restarted, the specific oil pressure is secured by the operation of the mechanical oil pump, where the mechanical oil pump is operated after the engine speed is increased. In this case, a shock may be produced when the clutch is engaged. Therefore, it is very important to confirm that the hydraulic system of the automatic transmission has no anomalies. If an abnormal portion is found, it is also very important how it is handled.

As an example of related known art, an engine stop control system may be applied to a vehicle, in which the engine is stopped under specific stopping conditions, and the engine is restarted under specific restarting conditions, and when the engine is automatically stopped, the electric oil pump is driven so as to continuously supply working fluid to the automatic transmission. In this system, it is determined whether the current state satisfies the working conditions of the electric oil pump, and if it is determined that the working conditions are not satisfied, automatic engine stop control, which is performed when the specific stopping conditions are satisfied, is prohibited (refer to Japanese Unexamined Patent Application, First Publication No. 2000-45807). Here, the working conditions for the electric oil pump are (i) the electric oil pump is in a normal state, the state of charge in a battery used for driving the electric oil pump is equal to or greater than a specific value, and (iii) the motor driven system for the electric oil pump is in a normal state.

However, in the above-explained known art, if the specific working oil pressure is not secured due to elements other than the electric oil pump (e.g., increase of clearance in the mechanical oil pump or valves, and degradation of seal members), then the automatic engine stop control is performed. Accordingly, when the engine is restarted, a shock may be produced when the clutch of the automatic transmission is engaged, as explained above.

SUMMARY OF THE INVENTION

In consideration of the above circumstances, an object of the present invention is to provide a control system for stopping and starting the engine of a vehicle, by which even when the electric oil pump is not in an abnormal state, if there is any element which may oppose securing a specific oil pressure by the electric oil pump, the specific oil pressure can be secured by the mechanical oil pump.

Therefore, the present invention provides an engine stop and start control system for a vehicle (e.g., a hybrid vehicle 1 in an embodiment explained below), wherein the vehicle comprises:

an engine (e.g., an engine 1 in the embodiment explained below) as a power source for driving the vehicle;

a transmission (e.g., a transmission 6 in the embodiment explained below) for transmitting power produced by the engine to an output shaft (e.g., an output shaft 6a in the embodiment explained below) of the vehicle; and a mechanical oil pump (e.g., an mechanical oil pump 11 in the embodiment explained below), operated by the power produced by the engine, for supplying oil pressure to the transmission via an oil pressure supply section (e.g., a hydraulic circuit 30 in the embodiment explained below), and the control system comprises:

an automatic engine stopping and starting section (e.g., a fuel injection and ignition control unit 7 in the embodiment explained below) for automatically stopping the engine under predetermined stopping conditions and automatically starting the engine under predetermined starting conditions; and an electric oil pump (e.g., an electric oil pump 12 in the embodiment explained below) operated when the predetermined stopping conditions are satisfied, so as to supply the oil pressure to the transmission, wherein the automatic engine stopping and starting section has a control section (e.g., an ECU 8 in the embodiment explained below) for prohibiting the automatic engine stop when a line pressure, which is the oil pressure in the oil pressure supply section, is equal to or lower than a predetermined value while the engine is operated.

According to the above structure, the automatic engine stop is prohibited when the line pressure is equal to or lower than a predetermined value while the engine is operated; thus, it is possible to prevent the line pressure from being further decreased, which may occur by operating the electric oil pump. Therefore, it is possible to prevent the clutch at the starting gear of the transmission from slipping while the engine is stopped, and degradation of the clutch or a shock in engagement of the clutch for starting the vehicle can also be prevented.

As a typical example, the predetermined value is determined depending on the number of rotations of an output shaft of the engine. In this case, prohibition of the automatic engine stop can be more suitably performed.

The control section may prohibit the automatic engine stop when the state in which the line pressure is equal to or lower than the predetermined value has continued for a predetermined time.

The present invention also provides an engine stop and start control system for a vehicle (e.g., a hybrid vehicle 1 in an embodiment explained below), wherein the vehicle comprises:

an engine (e.g., an engine 1 in the embodiment explained below) as a power source for driving the vehicle;

a transmission (e.g., a transmission 6 in the embodiment explained below) for transmitting power produced by the engine to an output shaft (e.g., an output shaft 6a in the embodiment explained below) of the vehicle; and a mechanical oil pump (e.g., an mechanical oil pump 11 in the embodiment explained below), operated by the power produced by the engine, for supplying oil pressure to the transmission, and the control system comprises:

an automatic engine stopping and starting section (e.g., a fuel injection and ignition control unit 7 in the embodiment explained below) for automatically stopping the engine under predetermined stopping conditions and automatically starting the engine under predetermined starting conditions; and an electric oil pump (e.g., an electric oil pump 12 in the embodiment explained below) operated when the predetermined stopping conditions are satisfied, so as to supply the oil pressure to the transmission via an oil pressure supply section (e.g., a hydraulic circuit 30 in the embodiment explained below), wherein the automatic engine stopping and starting section has a control section (e.g., an ECU 8 in the embodiment explained below) for restarting the engine when a line pressure, which is the oil pressure in the oil pressure supply section, is equal to or lower than a predetermined value while the engine is automatically stopped.

When the line pressure in the oil pressure supply section, via which the oil pressure is supplied from the electric oil pump to the transmission, becomes equal to or lower than the predetermined value while the engine is automatically stopped, if the supply of the hydraulic oil is continued by only operating the electric oil pump, the line pressure may be further decreased. However, according to the above structure, the engine is restarted and the mechanical oil pump is operated, thereby making the line pressure return to a normal value. Therefore, degradation or a shock in engagement of the clutch in the transmission can be prevented.

The control section may restart the engine when the state in which the line pressure is equal to or lower than the predetermined value has continued for a predetermined time.

The present invention also provides an engine stop and start control system for a vehicle (e.g., a hybrid vehicle 1 in an embodiment explained below), wherein the vehicle comprises:

an engine (e.g., an engine 1 in the embodiment explained below) as a power source for driving the vehicle;

a transmission (e.g., a transmission 6 in the embodiment explained below) for transmitting power produced by the engine to an output shaft (e.g., an output shaft 6a in the embodiment explained below) of the vehicle; and a mechanical oil pump (e.g., an mechanical oil pump 11 in the embodiment explained below), operated by the power produced by the engine, for supplying oil pressure to the transmission, and the control system comprises:

an automatic engine stopping and starting section (e.g., a fuel injection and ignition control unit 7 in the embodiment explained below) for automatically stopping the engine under predetermined stopping conditions and automatically starting the engine under predetermined starting conditions; and an electric oil pump (e.g., an electric oil pump 12 in the embodiment explained below) operated when the predetermined stopping conditions are satisfied, so as to supply the oil pressure to the transmission, wherein the automatic engine stopping and starting section has a control section (e.g., an ECU 8 in the embodiment explained below) for restarting the engine when a value of current flowing through a driving motor (e.g., an electric motor 13 in the embodiment explained below) for driving the electric oil pump is out of a predetermined range while the engine is automatically stopped.

When the value of current flowing through the driving motor of the electric oil pump increases while the engine is automatically stopped, the speed of rotation of the driving motor decreases, so that the discharge rate of the electric oil pump also decreases and the normal value of the line pressure cannot be secured. Accordingly, a pressure necessary for the clutch at the starting gear of the transmission may not be secured. When the value of current flowing through the driving motor of the electric oil pump is low, it is estimated that the discharge pressure of the electric oil pump is also low and that the amount of leakage of the oil pressure in the transmission is increasing. Also in this case, a pressure necessary for the clutch at the starting gear of the transmission may not be secured. In such cases, according to the above structure of the present invention, the engine is restarted and the mechanical oil pump is operated, thereby making the line pressure return to a normal value. Therefore, degradation or a shock in engagement of the clutch in the transmission can be prevented.

The control section may restart the engine when the state in which the value of current is out of the predetermined range has continued for a predetermined time.

The present invention also provides an engine stop and start control system for a vehicle (e.g., a hybrid vehicle 1 in an embodiment explained below), wherein the vehicle comprises:

an engine (e.g., an engine 1 in the embodiment explained below) as a power source for driving the vehicle;

a transmission (e.g., a transmission 6 in the embodiment explained below) for transmitting power produced by the engine to an output shaft (e.g., an output shaft 6a in the embodiment explained below) of the vehicle; and a mechanical oil pump (e.g., an mechanical oil pump 11 in the embodiment explained below), operated by the power produced by the engine, for supplying oil pressure to the transmission, and the control system comprises:

an automatic engine stopping and starting section (e.g., a fuel injection and ignition control unit 7 in the embodiment explained below) for automatically stopping the engine under predetermined stopping conditions and automatically starting the engine under predetermined starting conditions; and an electric oil pump (e.g., an electric oil pump 12 in the embodiment explained below) operated when the predetermined stopping conditions are satisfied, so as to supply the oil pressure to the transmission via an oil pressure supply section (e.g., a hydraulic circuit 30 in the embodiment explained below), where one of a driving voltage and a duty ratio in pulse width modulation of a driving motor (e.g., an electric motor 13 in the embodiment explained below) for driving the electric oil pump is controlled in a manner such that one of a line pressure, which is the oil pressure in the oil pressure supply section, and a value of current flowing through the driving motor coincides with a predetermined command value, wherein the automatic engine stopping and starting section has a control section (e.g., an ECU 8 in the embodiment explained below) for restarting the engine when one of the driving voltage and the duty ratio is equal to or greater than a predetermined value while the engine is automatically stopped.

When the driving voltage or the duty ratio in pulse width modulation for the electric oil pump becomes larger than a normal value while the engine is automatically stopped, it is estimated that the flow rate of leakage of the hydraulic oil in a hydraulic circuit of the transmission increases. However, according to the above structure, the engine is restarted and the mechanical oil pump is operated, thereby increasing the amount of supply of the hydraulic oil and making the line pressure return to a normal value. Therefore, degradation or a shock in engagement of the clutch in the transmission can be prevented.

The control section may restart the engine when the state in which one of the driving voltage and the duty ratio is equal to or greater than the predetermined value has continued for a predetermined time.

The present invention also provides an engine stop and start control system for a vehicle (e.g., a hybrid vehicle 1 in an embodiment explained below), wherein the vehicle comprises:

an engine (e.g., an engine 1 in the embodiment explained below) as a power source for driving the vehicle;

a transmission (e.g., a transmission 6 in the embodiment explained below) for transmitting power produced by the engine to an output shaft (e.g., an output shaft 6a in the embodiment explained below) of the vehicle; and a mechanical oil pump (e.g., an mechanical oil pump 11 in the embodiment explained below), operated by the power produced by the engine, for supplying oil pressure to the transmission, and the control system comprises:

an automatic engine stopping and starting section (e.g., a fuel injection and ignition control unit 7 in the embodiment explained below) for automatically stopping the engine under predetermined stopping conditions and automatically starting the engine under predetermined starting conditions; and an electric oil pump (e.g., an electric oil pump 12 in the embodiment explained below) operated when the predetermined stopping conditions are satisfied, so as to supply the oil pressure to the transmission, wherein the automatic engine stopping and starting section has a control section (e.g., an ECU 8 in the embodiment explained below) for restarting the engine when a temperature of hydraulic oil supplied to the transmission is equal to or higher than a predetermined value while the engine is automatically stopped.

When the temperature of the hydraulic oil increases, the viscosity of the oil decreases and the flow rate of leakage of the hydraulic oil in a hydraulic circuit of the transmission increases, so that the amount of supply of the hydraulic oil may be insufficient when using the electric oil pump. However, according to the above structure, the engine is restarted and the mechanical oil pump is operated, thereby increasing the amount of supply of the hydraulic oil and maintaining the line pressure at a normal value. Therefore, degradation or a shock in engagement of the clutch in the transmission can be prevented.

The present invention also provides an engine stop and start control system having the same basic structure as that explained above, wherein the automatic engine stopping and starting section has a different control section (e.g., an ECU 8 in the embodiment explained below) for prohibiting the automatic engine stop when a slip ratio of a clutch for a gear for starting the vehicle in the transmission exceeds a predetermined range in a predetermined time after the engine is restarted from the state in which the engine is automatically stopped.

While the hydraulic oil is supplied by the electric oil pump to the transmission, if a torque necessary for starting the vehicle cannot be transmitted, the clutch at the starting gear slips when the vehicle is started after the automatic stop of the engine. In this case, the abrasion of the clutch may be further advanced or a shock may be produced in engagement of the clutch. Therefore, the automatic engine stop is prohibited when the slip ratio of a clutch for the gear for starting the vehicle in the transmission exceeds a predetermined range in a predetermined time after the engine is restarted from the state in which the engine is automatically stopped. Accordingly, the electric oil pump is not operated, so that it is possible to prevent the clutch from slipping when the vehicle is started, and degradation or a shock in engagement of the clutch in the transmission can be prevented.

In each of the above-explained engine stop and start control systems, typically, the vehicle is a hybrid vehicle which further comprises an electric motor (e.g., a motor generator 3 in the embodiment explained below) as a power source for driving the vehicle; and the mechanical oil pump is operated by at least one of the power produced by the engine and power produced by the electric motor.

DESCRIPTION OF THE PREFERRED
EMBODIMENTS

Hereinafter, the engine stop and start control system for a hybrid vehicle, as an embodiment according to the present invention, will be explained with reference to FIGS. 1 to 5.

Figure 1:
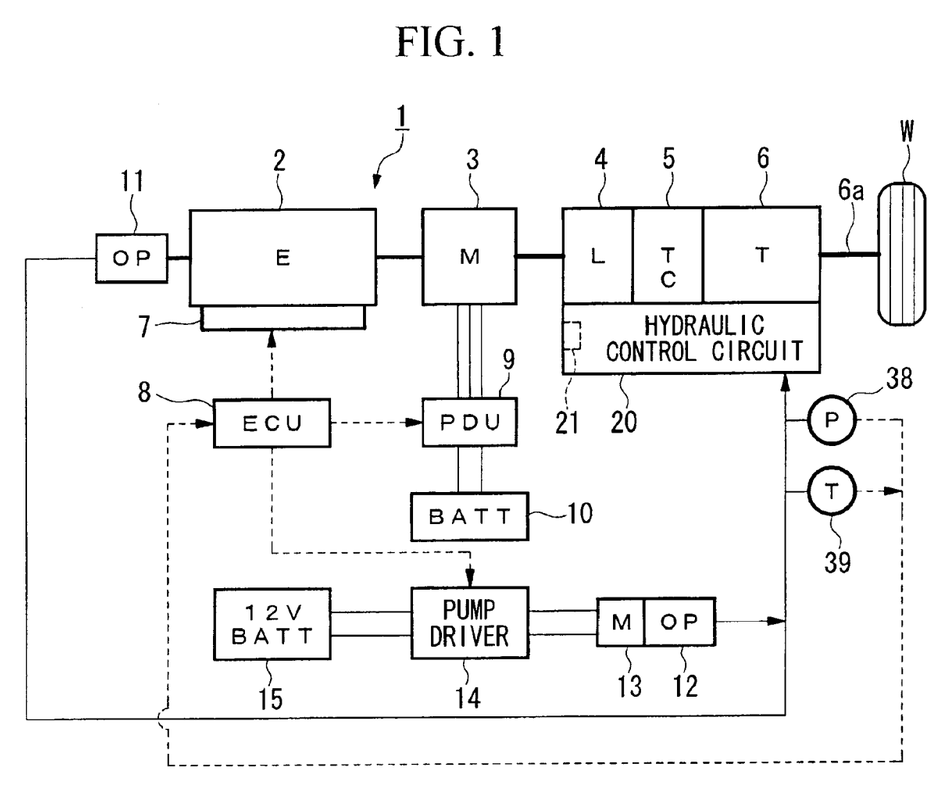
FIG. 1 is a diagram showing the general structure of the power transmission system of a hybrid vehicle which has an engine stop and start control system as an embodiment according to the present invention.

FIG. 1 is a diagram showing the general structure of the power transmission system of the hybrid vehicle 1 which has an engine stop and start control system in the present embodiment.

In this hybrid vehicle 1, the engine 2 and the motor 3 which can generate power (called the "motor generator", hereinbelow) are directly coupled with each other, and at least one power generated by the engine 2 and the motor generator 3 is transmitted via the torque converter 5 (to which a lockup clutch is provided) and the multi-stage automatic transmission 6 to the output shaft 6a, from which the power is further transmitted via a differential mechanism (not shown) to the driving wheels W of the vehicle.

The engine 2 is a multi-cylinder reciprocating engine and has a fuel injection and ignition control unit 7, which is provided for performing fuel ignition control for each cylinder and ignition control for the injected fuel. In the present embodiment, an electronic control throttle system (so-called a "drive by wire (DBW) system") is employed, and the operation of the throttle valve (not shown) with respect to the engine 2 is electronically controlled by the ECU (electronic control unit) 8, based on the degree of depression of the accelerator pedal.

The operation of the fuel injection and ignition control unit 7 is controlled by the ECU 8, and the automatic stop and start control for the engine 2 (the so-called "idle-stop control") is performed under specific conditions. Therefore, signals output from the following devices (not shown) are input into the ECU 8: a vehicle speed sensor for measuring the vehicle speed, an engine speed sensor for measuring the engine speed, a shift position sensor for detecting the shift position of the transmission 6, a brake switch for determining whether the brake pedal has been depressed, an accelerator pedal sensor for measuring the degree of depression of the accelerator pedal, a sensor for measuring remaining charge of the battery 10 (explained below), and the like.

In the present embodiment, the fuel injection and ignition control unit 7 and the ECU 8 for controlling the control unit 7 function as the automatic engine stopping and starting section of the present invention.

The torque converter 5 is provided for performing torque transmission between the output shaft of the motor generator 3 and the input shaft of the transmission 6 via fluid while the lock-up clutch 4 is disengaged. When the lock-up clutch is engaged, the output shaft of the motor generator 3 and the input shaft of the transmission 6 are substantially directly coupled with each other, so that torque is directly transmitted between the above output shaft and the above input shaft, independent of the fluid. The engagement/disengagement of the lock-up clutch 4 and the speed change by the transmission 6 are performed based on the driving state of the vehicle, by hydraulic control of the hydraulic control circuit 20.

When the driving power (or force) is transmitted from the driving wheels W to the motor generator 3 while the hybrid vehicle 1 is decelerated, the motor generator 3 functions as a generator and generates the so-called regenerative braking force, and the kinetic energy of the vehicle (body) is recovered as electrical energy, thereby charging the recovered energy into the battery 10 via the PDU (power drive unit) 9. Here, the regenerative output is controlled by the ECU 8 via the PDU 9.

The motor generator 3 is driven while consuming the electrical energy charged into the battery 10, and the motor generator 3 is controlled by the ECU 8 via the PDU 9. A capacitor may be used in place of the battery 10.

The hybrid vehicle 1 also has a mechanical oil pump 11 and an electric oil pump 12 as sources for supplying oil pressure to the hydraulic control circuit 20, where the electric oil pump 12 has a capacity less than that of the mechanical oil pump 11. The mechanical oil pump 11 is coupled with the output shaft of the engine 2 and is operated by the driving power which is produced by the engine 2 or the motor generator 3.

The electric oil pump 12 is operated by an electric motor 13 (i.e., a driving motor), and the pump driver 14 supplies electrical power of the 12V-battery 15 to the electric motor 13. The electric oil pump 12 is controlled in a manner such that the pump 12 is operated when the engine 2 and the motor generator 3 are stopped and the mechanical oil pump 11 cannot be operated. That is, when the pump driver 14 receives an engine stop command signal, the pump driver 14 starts the electric oil pump 12, and after that, stops the electric oil pump 12 under specific conditions.

Here, stopping of the engine is permitted when all of predetermined conditions are satisfied. The predetermined conditions may include (i) the vehicle speed is equal to or lower than a predetermined speed (preferably, 10 km/h) or the engine speed is equal to or lower than a predetermined speed, (ii) the degree of depression of the accelerator pedal is 0 (i.e., not depressed), (iii) the brake switch is in the ON state, (iv) the remaining charge of the battery 10 is equal to or greater than a predetermined value, (v) the transmission 6 is in a specific shift position, and (vi) the transmission 6 is in a specific hydraulic control state. When the stopping of the engine is permitted, an engine stop command signal is output from the ECU 8 to the pump driver 14. After the engine 2 is started, when the working oil pressure of the mechanical oil pump 11 is added to the line pressure (i.e., the oil pressure of the hydraulic oil) and the line pressure becomes equal to or higher than a threshold value, the electric oil pump 12 is stopped.

Figure 2:
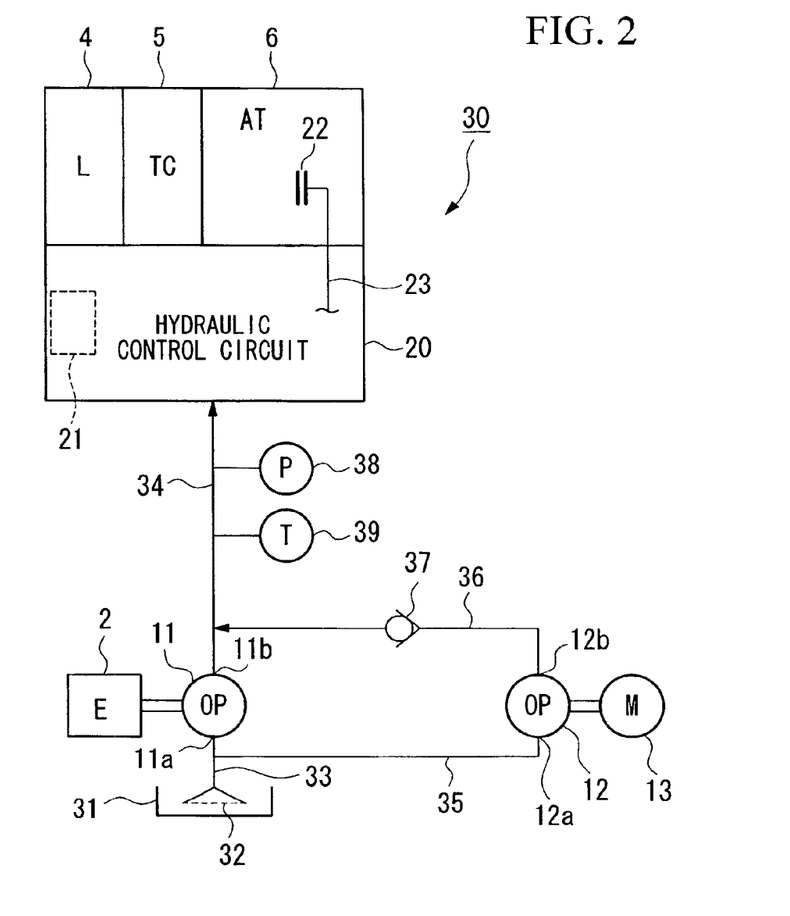
FIG. 2 is a diagram showing the structure of the hydraulic circuit for the automatic transmission in the embodiment.

Below, the hydraulic circuit 30 (i.e., the oil pressure supply section) for supplying oil pressure to the transmission 6 will be explained with reference to FIG. 2.

The suction port 11a of the mechanical oil pump 11 is connected via the suction pipe 33 to the strainer 32 which is provided in the oil pan 31. The discharge port 11b of the mechanical oil pump 11 is connected via the discharge pipe 34 to the hydraulic control circuit 20.

The suction port 12a of the electric oil pump 12 is connected via the suction pipe 35 to the suction pipe 33, while the discharge port 12b of the electric oil pump 12 is connected via the discharge pipe 36 to the discharge pipe 34. To the discharge pipe 36, a check valve 37 is attached, which is provided for permitting the hydraulic oil to flow from the discharge port 12b of the electric oil pump 12 to the discharge pipe 34 and for prohibiting the hydraulic oil from flowing from the discharge pipe 34 to the discharge port 12b.

As is known, the hydraulic control circuit 20 includes (i) a manual valve (not shown) which is operated together with the shift lever (beside the driver's seat) so as to select the oil passage for the hydraulic oil supplied from the discharge pipe 34, from among the passages corresponding to the forward travel, the neutral position, and the reverse travel, (ii) a plurality of shift valves (not shown) for controlling the passage and the oil pressure of the hydraulic oil supplied from the discharge pipe 34, (iii) a group of solenoid valves 21 for controlling the pilot pressure of the shift valves, and the like. Therefore, the oil passage and the oil pressure are controlled by using the shift valves according to the driving state of the vehicle, thereby controlling the operation of each clutch of the transmission 6 and the brake (neither are shown) and performing automatic optimal control of the gear position of the transmission 6.

In the hybrid vehicle of the present embodiment, when the vehicle is started, the shift valves are controlled in a manner such that the clutch for the gear for starting the vehicle (i.e., the first or second gear) is engaged. Here, FIG. 2 shows only the clutch 22 for the gear for starting the vehicle (called "the starting gear", hereinbelow) and a portion of the oil passage 23 for supplying the oil pressure to this clutch 22, and the clutches for the other gears, the brake, and the other oil passages are not shown. In the following explanations, the oil pressure of the clutch at the starting gear indicates the oil pressure supplied to the clutch 22.

An oil pressure sensor 38 and an oil temperature sensor 39 are attached to the discharge pipe 34, where the sensors 38 and 39 are positioned at the downstream side of the joint point where the discharge pipe 36 is connected to the discharge pipe 34. The oil pressure sensor 38 is provided for measuring the oil pressure of the hydraulic oil (i.e., the line pressure) which flows through the discharge pipe 34, and the oil temperature sensor 39 is provided for measuring the temperature of the hydraulic oil. The oil pressure sensor 38 is provided at the downstream side of the joint point, as explained above; thus, the oil pressure sensor 38 can measure both (i) the line pressure of the hydraulic circuit 30 when the oil pressure is supplied from the mechanical oil pump 11 to the transmission 6, and (ii) the line pressure of the hydraulic circuit 30 when the oil pressure is supplied from the electric oil pump 12 to the transmission 6. The output signals from the oil pressure sensor 38 and the oil temperature sensor 39 are input into the ECU 8. The oil temperature sensor 39 may be provided in the oil pan 31, instead of providing it at the discharge pipe 34.

The electric motor 13 of the electric oil pump 12 is controlled by the ECU 8 in a manner such that the line pressure measured by the oil pressure sensor 38 or the current value of the current which flows through the electric motor 13 coincides with a specific command value. In an applicable method for controlling the electric motor 13, the input DC (direct current) voltage (called the "driving voltage", hereinbelow) supplied from the battery 15 to the pump driver 14 may be controlled, or the effective output voltage of the pump driver 14 may be controlled by controlling the duty ratio in pulse width modulation (PWM).

Below, the engine stop and start control in the hybrid vehicle 1 in the present embodiment will be explained.

In this hybrid vehicle 1, while the engine 2 is stopped, the electric oil pump 12 is operated so as to maintain the working oil pressure of the transmission 6 at a predetermined value necessary for the torque transmission.

Here, the clutch of the transmission 6 pushes the clutch piston by the oil pressure, so as to press against the clutch disk, thereby transmitting the torque. Therefore, when the oil pressure is insufficient, the clutch may slip and may be degraded. In this case, when the oil pressure is recovered and the clutch is reengaged, a shock may be produced. In order to solve such a problem, the hybrid vehicle 1 employs the following measures.

During the Operation of the Engine

The line pressure of the hydraulic circuit 30 is determined according to the flow rate of the supplied hydraulic oil and the conditions relating to the hydraulic circuit 30 (e.g., the driving state of the mechanical oil pump 11, clearance of each shift valve provided in the hydraulic control circuit 20, degree of degradation of each seal member, and the temperature of the hydraulic oil). When the flow rate of the supplied hydraulic oil is large, the line pressure increases. When the amount of leakage of the hydraulic oil in the hydraulic control circuit 20 increases, the line pressure decreases.

When the line pressure decreases below a predetermined value while the engine 2 is operated (i.e., the mechanical oil pump 11 is operated), it is estimated that the amount of leakage of the hydraulic oil is increasing in the hydraulic control circuit 20.

If the engine 2 is automatically stopped under such conditions and the electric oil pump 12, which has a capacity less than that of the mechanical oil pump 11, is operated, then the line pressure probably decreases, so that the working oil pressure of the clutch 22 for the starting gear becomes insufficient and the clutch 22 may slip, and accordingly, the clutch 22 may be degraded. In addition, when the engine 2 is restarted (after the automatic stop) and the mechanical oil pump 11 is operated, the recovery of the working oil pressure of the clutch 22 may produce a shock in the clutch engagement.

In order to prevent the above problems, in the engine stop and start control system in the present embodiment, when the line pressure, measured by the oil pressure sensor 38 while the engine 2 is operated, is equal to or lower than a predetermined value, the automatic stop of the engine 2 is prohibited.

Figure 5:
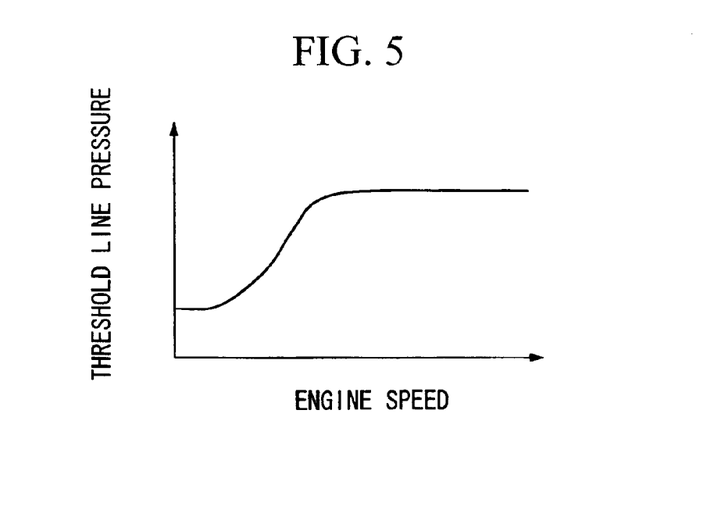
FIG. 5 is a diagram showing the line pressure threshold table used in the embodiment.

Here, the flow rate of the discharge of the mechanical oil pump 11 varies nearly in proportion to the engine speed of the engine 2; thus, the flow rate of leakage of the hydraulic oil in the hydraulic control circuit 20 can be evaluated based on the engine speed of the engine 2 and the line pressure measured by the oil pressure sensor 38. As shown in FIG. 5, (each value of) the threshold of the line pressure (i.e., the threshold line pressure) depending on the engine speed of the engine 2 is determined and stored in advance, and a threshold line pressure suitable for the operation state of the engine is searched for and retrieved. When the line pressure measured by the oil pressure sensor 38 is lower than the retrieved threshold line pressure, the automatic stop of the engine 2 is prohibited, thereby more properly performing the prohibition of automatic stop of the engine 2.

During the Automatic Stop of the Engine

When the line pressure measured by the oil pressure sensor 38 becomes equal to or lower than a predetermined value while the engine 2 is automatically stopped (i.e., while the mechanical oil pump 11 is stopped and the electric oil pump 12 is operated), it is also estimated that the flow rate of leakage of the hydraulic oil in the hydraulic control circuit 20 increases. Therefore, if the supply of the hydraulic oil by only using the electric oil pump 12 is continued in this state, the line pressure may be further decreased. Here, if no decrease of the line pressure is produced before the engine is automatically stopped, that is, when the engine 2 is operated and the hydraulic oil is supplied by operating the mechanical oil pump 11, then preferably, the engine 2 is restarted and the mechanical oil pump 11 is operated so as to quickly recover a normal line pressure, before the line pressure is further decreased. According to such recovery, it is possible to prevent degradation or a shock in engagement of the clutch 22 for the transmission 6. Therefore, when the line pressure, which is measured by the oil pressure sensor 38 while the engine 2 is automatically stopped, becomes equal to or lower than a predetermined value, the engine 2 is restarted so as to make the engine run in the idling state.

Also when the value of current flowing through electric motor 13 of the electric oil pump 12 exceeds a predetermined range while the engine 2 is automatically stopped, the engine 2 is restarted. The reason for this follows.

The electric motor 13 produces torque by current, and the drive shaft of the electric oil pump 12 is rotated by this torque, thereby discharging the hydraulic oil. In this process, a larger torque is necessary for discharging hydraulic oil having a higher discharge pressure. That is, the higher the discharge pressure, the larger the current of the electric motor 13. Here, the hydraulic circuit 30 includes various kinds of elements such as the check valve 37, other valves (not shown), filters (also not shown), bent portions (also not shown), and the like. Therefore, if a problem (such as clogging) occurs at one of the above elements and the pressure loss increases, then the discharge pressure of the electric oil pump 12 increases. If the operation of the electric motor 13 is continued with such large current due to the increase of the discharge pressure, abrasion of the brush of the electric motor 13 is advanced.

In addition, when the torque of the electric motor 13 increases, the speed of rotation of the electric motor 13 decreases, so that the discharge rate of the electric oil pump 12 also decreases and a pressure necessary for the clutch 22 at the starting gear of the transmission 6 cannot be secured. Accordingly, the above-explained degradation or shock in engagement of the clutch 22 in the transmission 6 may be produced. Therefore, in order to solve such problems, when the value of current flowing through electric motor 13 becomes equal to or higher than a predetermined value while the engine 2 is automatically stopped, the engine 2 is immediately restarted so as to run the engine 2 in the idling state.

On the other hand, when the amount of leakage of the oil pressure in the hydraulic control circuit 20 increases, the discharge pressure of the electric oil pump 12 decreases, so that the value of the current flowing through the electric motor 13 of the electric oil pump 12 also decreases. Also in this case, a pressure necessary for the clutch 22 at the starting gear of the transmission 6 cannot be secured, and degradation or a shock in engagement of the clutch 22 in the transmission 6 may be produced. In order to solve such a problem, when the value of current flowing through the electric motor 13 becomes equal to or lower than a predetermined value while the engine 2 is automatically stopped, the engine 2 is immediately restarted so as to run the engine 2 in the idling state.

When the load torque of the electric oil pump 12 with respect to the electric motor 13 is constant, the speed of rotation of the electric motor 13 increases according to increase of the driving voltage or the duty ratio of the PWM control. In the present embodiment, the driving voltage control or the PWM control for the electric motor 13 is performed so as to make the line pressure measured by the oil pressure sensor 38 or the value of current flowing through the electric motor 13 coincide with a predetermined command value. In this case, when the flow rate of leakage of the hydraulic oil in the hydraulic control circuit 20 increases, control for increasing the driving voltage or the duty ratio is performed so as to increase the rotational speed of the electric oil pump 12 and to increase the flow rate of discharge (of the electric oil pump). However, if the flow rate of leakage of the hydraulic oil excessively increases, the flow rate of discharge of the electric oil pump 12 cannot sufficiently increase, so that the line pressure may be decreased.

Therefore, when the driving voltage of the electric oil pump 12 (i.e., the driving voltage of the electric motor 13) or the duty ratio becomes equal to or greater than a predetermined value while the engine 2 is automatically stopped, it is estimated that the flow rate of leakage of the hydraulic oil in the hydraulic control circuit 20 increases. Therefore, the engine 2 is immediately restarted so as to make the engine run in the idling state and to prevent degradation or a shock in engagement of the clutch in the transmission 6, as explained above.

In addition, when the temperature of the hydraulic oil increases, the viscosity of the oil decreases and the flow rate of leakage in the hydraulic control circuit 20 increases. If the engine 2 is automatically stopped and the hydraulic oil is supplied to the hydraulic control circuit 20 by operating only the electric oil pump 12 while the hydraulic oil has such a high temperature, then the flow rate of discharge of the electric oil pump 12 having a small capacity may be insufficient for increasing the line pressure to a specific value, so that an oil pressure necessary for the clutch 22 at the starting gear may not be secured and the clutch 22 may slip.

Therefore, when the temperature of the hydraulic oil measured by the oil temperature sensor 39 becomes equal to or higher than a predetermined value while the engine 2 is automatically stopped, the engine 2 is immediately restarted and made to run in the idling state, so as to make the torque produced by the engine 2 have a value corresponding to the creep torque (for starting the vehicle in a drive gear range). Accordingly, it is possible to prevent the clutch 22 at the starting gear from slipping, and a shock in engagement of the clutch 22 can also be prevented when the vehicle is started.

At the Time of Starting the Vehicle

While the hydraulic oil is supplied by the electric oil pump 12 to the hydraulic control circuit 20, if the clutch 22 at the starting gear of the transmission 6 cannot transmit a torque necessary for starting the vehicle due to abrasion of the clutch or a problem in an oil passage, then the clutch 22 at the starting gear slips when the vehicle is started after the automatic stop of the engine 2. In this case, the load torque imposed on the engine 2 is small; thus, the number of rotations of the output shaft of the engine 2 is higher than that at the normal start of the vehicle (i.e., when the vehicle is normally started after the automatic stop of the engine), thereby further advancing abrasion of the clutch 22 at the starting gear. In addition, the amount of discharge of the mechanical oil pump 11 increases according to the increase of the engine speed, and the oil pressure is increased. Therefore, the transmission torque of the clutch 22 at the starting gear increases, so that a shock may be produced in engagement of the clutch 22.

Therefore, in order to solve such problems, if the slip ratio of the clutch 22 at the starting gear exceeds a predetermined range in a predetermined time after the restart of the engine, then automatic stopping of the engine 2 is prohibited so as not to operate the electric oil pump 12. Here, the slip ratio of the clutch 22 indicates a ratio of difference between the numbers of rotations of the input and the output to the number of rotations of the input.

Below, the engine stop and start control of the hybrid vehicle 1 will be explained with reference to the flowcharts shown in FIGS. 3 and 4.

Figure 3:
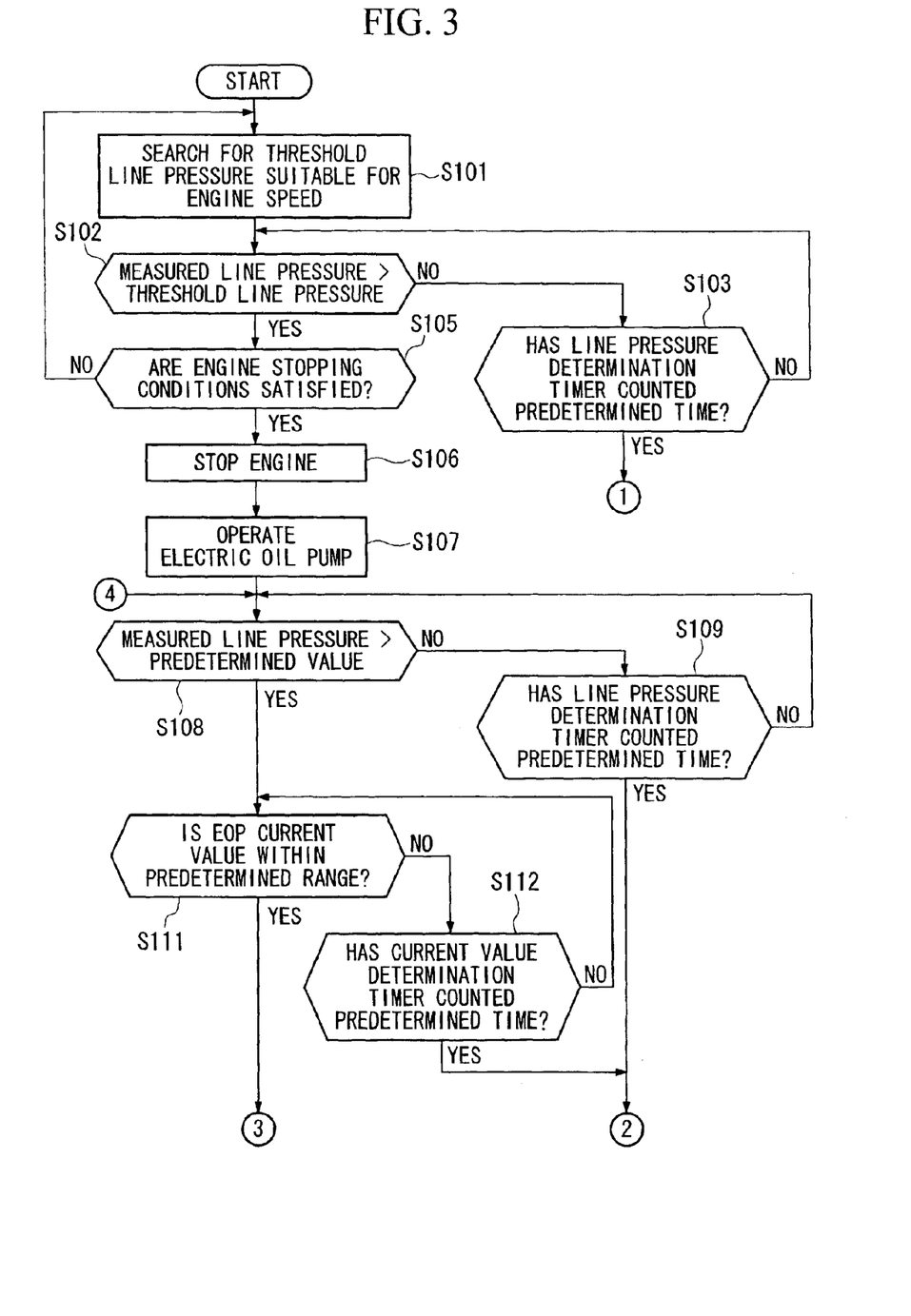
FIG. 3 is a flowchart of an engine stop and start control routine performed in the embodiment.
Figure 4:
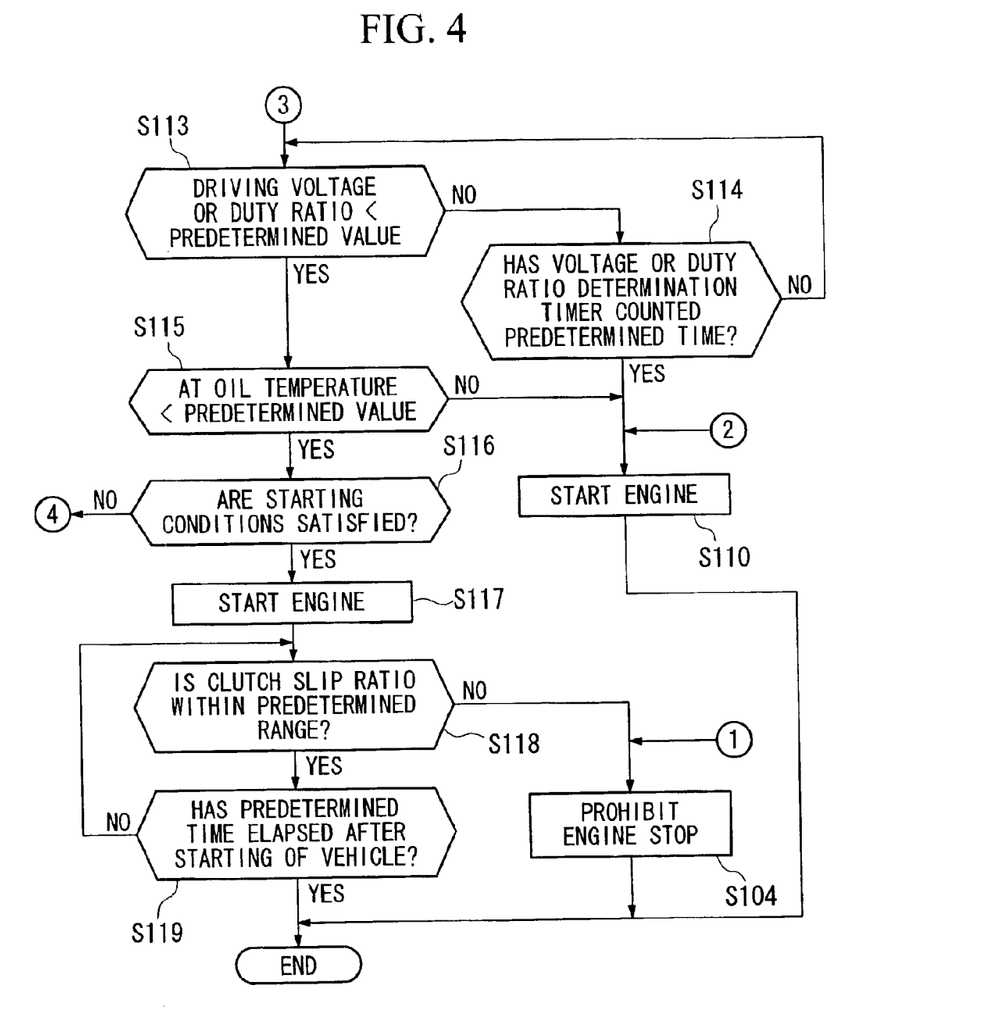
FIG. 4 is also a flowchart of the engine stop and start control routine in the embodiment.

The flowcharts in FIGS. 3 and 4 show an engine stop and start control routine, which is executed by the ECU 8.

It is assumed that the engine 2 is operated in the hybrid vehicle I at the starting of the engine stop and start control routine, that is, the mechanical oil pump 11 is operated.

In the first step S101, a threshold of the line pressure (i.e., a threshold line pressure) suitable for the current engine speed of the engine 2 is searched for by referring to the line pressure threshold table as shown in FIG. 5.

In the next step S102, it is determined whether the line pressure measured by the oil pressure sensor 38 is higher than the threshold line pressure searched for in the step S101.

If the result of the determination of step S102 is "NO" (i.e., the measured line pressure≦the threshold line pressure), the operation proceeds to step S103. In step S103, it is determined whether a line pressure determination timer for measuring the duration of the state of "the measured line pressure≦the threshold line pressure" has counted a predetermined time, that is, whether the predetermined time has passed.

If the result of the determination of step S103 is "NO" (i.e., the predetermined time has not yet elapsed), the operation returns to step S102, while if the result of the determination is "YES" (i.e., the predetermined time has elapsed), the operation proceeds to step S104. In step S104, the automatic stopping operation of the engine 2 is prohibited and the operation of this routine is terminated for the present (i.e., the routine will be executed again at a suitable time). That is, the automatic stop of the engine 2 is prohibited when the state of "the measured line pressure≦the threshold line pressure" has continued for a predetermined time while the engine 2 is operated.

If the result of the determination of step S102 is "YES" (i.e., the measured line pressure>the threshold line pressure), the operation proceeds to step S105, where it is determined whether specific conditions for performing the automatic stop of the engine 2 are satisfied. The specific conditions include (i) the vehicle speed equal to or lower than a predetermined value (preferably, 10 km/h), (ii) 0 degree of depression of the accelerator pedal, (iii) the ON state of the brake pedal, (iv) the remaining charge of the battery 10 equal to or greater than a predetermined value, and the like.

If the result of the determination of step S105 is "NO" (i.e., the above conditions are not satisfied), the operation returns to step S101, while if the result of the determination is "YES" (i.e., the above conditions are satisfied), the engine 2 is automatically stopped (see step S106) and the electric oil pump 12 is operated (see step S107).

The operation then proceeds to step S108, where it is determined whether the line pressure measured by the oil pressure sensor 38 is higher than a predetermined value.

If the result of the determination of step S108 is "NO" (i.e., the measured line pressure≦the predetermined value), the operation proceeds to step S109. In step S109, it is determined whether a line pressure determination timer for measuring the duration of the state of "the measured line pressure≦the predetermined value" has counted a predetermined time, that is, whether the predetermined time has passed.

If the result of the determination of step S109 is "NO" (i.e., the predetermined time has not yet elapsed), the operation returns to step S108, while if the result of the determination is "YES" (i.e., the predetermined time has elapsed), the operation proceeds to step S110. In step S110, the engine 2 is restarted and the operation of this routine is terminated for the present. That is, the engine 2 is restarted when the state of "the measured line pressure≦the predetermined value" has continued for a predetermined time while the engine 2 is stopped.

If the result of the determination of step S108 is "YES" (i.e., the measured line pressure>the predetermined value), the operation proceeds to step S111. In step S111, it is determined whether the value of current flowing through the electric motor 13 of the electric oil pump 13 (called the EOP current value) is within a predetermined range.

If the result of the determination of step S111 is "NO" (i.e., out of the predetermined range), the operation proceeds to step S112. In step S112, it is determined whether a current value determination timer for measuring the duration of the state in which the current value of the electric motor 13 is out of the predetermined range has counted a predetermined time, that is, whether the predetermined time has passed.

If the result of the determination of step S112 is "NO" (i.e., the predetermined time has not yet elapsed), the operation returns to step S111, while if the result of the determination is "YES" (i.e., the predetermined time has elapsed), the operation proceeds to step S110. In step S110, the engine 2 is restarted and the operation of this routine is terminated for the present. That is, the engine 2 is restarted when the state in which the current value of the electric motor 13 is out of the predetermined range has continued for a predetermined time while the engine 2 is stopped.

If the result of the determination of step S111 is "YES" (i.e., within the predetermined range), the operation proceeds to step S113, where it is determined whether the driving voltage or the duty ratio (of the PWM control) of the electric motor 13 is smaller than a predetermined value (i.e., a predetermined driving voltage or a predetermined duty ratio).

If the result of the determination of step S113 is "NO" (i.e., the driving voltage or the duty ratio≧the predetermined value), the operation proceeds to step S114. In step S114, it is determined whether a voltage or duty ratio determination timer for measuring the duration of the state of "the driving voltage or the duty ratio≧the predetermined value" has counted a predetermined time, that is, whether the predetermined time has passed.

If the result of the determination of step S114 is "NO" (i.e., the predetermined time has not yet elapsed), the operation returns to step S113, while if the result of the determination is "YES" (i.e., the predetermined time has elapsed), the operation proceeds to step S110. In step S110, the engine 2 is restarted and the operation of this routine is terminated for the present. That is, the engine 2 is restarted when the state in which the driving voltage or the duty ratio of the electric motor 13 of the electric oil pump 12 is equal to or greater than the predetermined value has continued for a predetermined time while the engine 2 is stopped.

If the result of the determination of step S113 is "YES" (i.e., the driving voltage or the duty ratio<the predetermined value), the operation proceeds to step S115, where it is determined whether the temperature of the hydraulic oil (called the AT oil temperature) measured by the oil temperature sensor 39 is lower than a predetermined value.

If the result of the determination of step S115 is "NO" (i.e., the AT oil temperature≧the predetermined value), the operation proceeds to step S110, where the engine 2 is restarted and the operation of this routine is terminated for the present. That is, the engine 2 is restarted when the temperature of the hydraulic oil is equal to or higher than the predetermined value while the engine is stopped.

If the result of the determination of step S115 is "YES" (i.e., the AT oil temperature≧the predetermined value), the operation proceeds to step S116, where it is determined whether conditions for starting the vehicle are satisfied. The conditions include the off-state of the brake switch, and the like.

If the result of the determination of step S116 is "NO" (i.e., the above conditions are not satisfied), the operation returns to step S108, while if the result of the determination is "YES" (i.e., the above conditions are satisfied), the engine 2 is restarted (see step S117).

The operation then proceeds to step S118, where it is determined whether the slip ratio of the clutch 22 at the starting gear is within a predetermined range. If the result of the determination of step S118 is "NO" (i.e., out of the predetermined range), the operation proceeds to step S104, where the automatic stop of the engine 2 is prohibited and the operation of this routine is terminated for the present.

If the result of the determination of step S118 is "YES" (i.e., within the predetermined range), the operation proceeds to step S119. In step S119, it is determined whether a predetermined time has elapsed after the starting of the vehicle. If the result of the determination of step S119 is "NO" (i.e., the predetermined time has not yet elapsed), the operation returns to step S118, while if the result of the determination is "YES" (i.e., the predetermined time has elapsed), the operation of this routine is terminated for the present. That is, the automatic stop of the engine 2 is prohibited when the slip ratio of the clutch 22 at the starting gear exceeds the predetermined range in the predetermined time after the engine 2 is restarted.

As explained above, in the engine stop and start control system of the present embodiment, if the line pressure of the hydraulic circuit 30 of the transmission 6 decreases or a decrease of the line pressure is estimated, the operation of the engine 2 is continued or restarted so as to operate the mechanical oil pump 11, thereby suppressing or preventing decrease of the line pressure. Therefore, degradation of the clutch 22 at the starting gear of the transmission 6 can be prevented, and a shock in engagement of the clutch 22 for starting the vehicle can also be prevented.

The present invention is not limited to the above-explained embodiment.

For example, in the hybrid vehicle of the above embodiment, the engine and the motor generator are directly coupled. However, the present invention can also be applied to a hybrid vehicle in which the engine and the motor generator are connected in parallel to each other and the vehicle is driving by using one or both of the driving force produced by the engine and the driving force produced by the motor generator.

In addition, the present invention can also be applied to vehicles other than the hybrid vehicles, that is, to a vehicle which has the engine as a single driving power source (i.e., does not have a motor as a driving power source), and mechanical and electric oil pumps.

What is claimed is:

1. An engine stop and start control system for a vehicle, wherein the vehicle comprises:

an engine as a power source for driving the vehicle;

a transmission for transmitting power produced by the engine to an output shaft of the vehicle; and a mechanical oil pump, operated by the power produced by the engine, for supplying oil pressure to the transmission, and the control system comprises:

an automatic engine stopping and starting section automatically stopping the engine under predetermined stopping conditions, automatically starting the engine under predetermined starting conditions, and restarting the engine when a value of current flowing through a driving motor for driving an electric oil pump is out of a predetermined range while the engine is automatically stopped, wherein the electric oil pump is operated when the predetermined stopping conditions are satisfied, so as to supply the oil pressure to the transmissions.

2. An engine stop and start control system as claimed in claim 1, wherein the control section restarts the engine when the state in which the value of current is out of the predetermined range has continued for a predetermined time.

3. An engine stop and start control system for a vehicle, wherein the vehicle comprises:

an engine as a power source for driving the vehicle;

a transmission for transmitting power produced by the engine to an output shaft of the vehicle; and a mechanical oil pump, operated by the power produced by the engine, for supplying oil pressure to the transmission, and the control system comprises:

an automatic engine stopping and starting section automatically stopping the engine under predetermined stopping conditions, automatically starting the engine under predetermined starting conditions, and restarting the engine when one of a driving voltage and a duty ratio in pulse width modulation of a driving motor for driving an electric oil pump is equal to or greater than a predetermined value while the engine is automatically stopped, wherein the electric oil pump is operated when the predetermined stopping conditions are satisfied, so as to supply the oil pressure to the transmission via an oil pressure supply section, where one of the driving voltage and the duty ratio is controlled in a manner such that one of a line pressure, which is the oil pressure in the oil pressure supply section, and a value of current flowing through the driving motor coincides with a predetermined command value.

4. An engine stop and start control system as claimed in claim 3, wherein the control section restarts the engine when the state in which one of the driving voltage and the duty ratio is equal to or greater than the predetermined value has continued for a predetermined time.

5. An engine stop and start control system for a vehicle, wherein the vehicle comprises:

an engine as a power source for driving the vehicle;

a transmission for transmitting power produced by the engine to an output shaft of the vehicle; and a mechanical oil pump, operated by the power produced by the engine, for supplying oil pressure to the transmission, and the control system comprises:

an automatic engine stopping and starting section automatically stopping the engine under predetermined stopping conditions, automatically starting the engine under predetermined starting conditions, and prohibiting the automatic engine stop when a slip ratio of a clutch for a gear for starting the vehicle in the transmission exceeds a predetermined range in a predetermined time after the engine is restarted from the state in which the engine is automatically stopped; and an electric oil pump operated when the predetermined stopping conditions are satisfied, so as to supply the oil pressure to the transmission.

6. An engine stop and start control system as claimed in any one of claims 1, 3, and 5, wherein:

the vehicle is a hybrid vehicle which further comprises an electric motor as a power source for driving the vehicle; and the mechanical oil pump is operated by at least one of the power produced by the engine and power produced by the electric motor.

* * * * *